United States Patent [19]

Eckert et al.

[11] Patent Number: 5,168,570

[45] Date of Patent: Dec. 1, 1992

[54] METHOD AND APPARATUS FOR A MULTIPLE REQUEST TOGGLING PRIORITY SYSTEM

[75] Inventors: Roger E. Eckert; Andrew E. Phelps, both of Eau Claire, Wis.

[73] Assignee: Supercomputer Systems Limited Partnership, Eau Claire, Wis.

[21] Appl. No.: 536,417

[22] Filed: Jun. 11, 1990

Related U.S. Application Data

[63] Continuation-in-part of Ser. No. 459,083, Dec. 29, 1989.

[51] Int. Cl.⁵ .................. G06F 13/34; G06F 15/16
[52] U.S. Cl. .................. 395/725; 364/242.6; 364/941.2
[58] Field of Search .................. 395/725, 650; 364/200 MS File, 900 MS File, DIG. 1, DIG. 2

[56] References Cited

U.S. PATENT DOCUMENTS

| | | | |
|---|---|---|---|
| 3,925,766 | 12/1975 | Bardotti et al. | 364/200 |
| 4,009,470 | 2/1977 | Danilenko et al. | 364/200 |
| 4,229,791 | 10/1980 | Levy et al. | 364/200 |
| 4,257,095 | 3/1981 | Nadir | 364/200 |
| 4,271,467 | 6/1981 | Holtey | 364/200 |
| 4,314,335 | 2/1982 | Pezzi | 364/200 |
| 4,370,709 | 1/1983 | Fordick | 364/200 |
| 4,392,200 | 7/1983 | Arulpragasam et al. | 364/200 |
| 4,449,183 | 5/1984 | Flahive et al. | 364/200 |
| 4,454,581 | 6/1984 | Nystrom | 364/200 |
| 4,473,880 | 9/1984 | Budde et al. | 364/200 |
| 4,499,538 | 2/1985 | Finger | 364/200 |
| 4,636,942 | 1/1987 | Chen et al. | 364/200 |
| 4,675,812 | 6/1987 | Capowski | 364/200 |
| 4,719,569 | 1/1988 | Ludemann | 364/200 |
| 4,745,545 | 5/1988 | Schiffleger | 364/200 |
| 4,754,398 | 6/1988 | Pribnow | 364/200 |
| 4,816,990 | 3/1989 | Williams | 364/200 |
| 4,845,722 | 7/1989 | Kent et al. | 370/60 |
| 4,894,769 | 1/1990 | Conforti | 364/200 |
| 4,920,485 | 4/1990 | Vahidsafa | 364/200 |
| 4,937,733 | 6/1990 | Gillett, Jr. et al. | 364/200 |
| 4,949,239 | 8/1990 | Gillett, Jr. et al. | 364/200 |
| 4,972,342 | 11/1990 | Davis | 364/200 |
| 4,979,099 | 12/1990 | Milia et al. | 364/200 |
| 5,012,409 | 4/1991 | Fletcher | 364/200 |
| 5,016,162 | 5/1991 | Epstein et al. | 364/200 |
| 5,016,167 | 5/1991 | Nguyen et al. | 364/200 |
| 5,053,942 | 10/1991 | Srini | 364/200 |

Primary Examiner—David Y. Eng
Attorney, Agent, or Firm—Patterson & Keough

[57] ABSTRACT

A multiple request toggling (MRT) arbitration system for prioritizing requests to a set of shared resources by multiple requestors, especially requests by multiple processors to shared resources in a multiprocessor system. The MRT arbitration system assigns priority to multiple requests on a first-come, first-serve basis with the priority of multiple simultaneous requests being resolved through an arbitration network.

28 Claims, 7 Drawing Sheets

HIGHEST                    LOWEST

INITIAL STATE:  REQ 3 – REQ 2 – REQ 1 – REQ 0

HIGHEST                    LOWEST

TIME 1:  REQ 3 – REQ 1 – REQ 0 – REQ 2

HIGHEST — LOWEST

TIME 2:   REQ 0 – REQ 2 – REQ 1 – REQ 3

HIGHEST — LOWEST

TIME 3   REQ 2 – REQ 1 – REQ 3 – REQ 0

METHOD AND APPARATUS FOR A MULTIPLE REQUEST TOGGLING PRIORITY SYSTEM

RELATED APPLICATION

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, and assigned to the assignee of the present invention, which is hereby incorporated by reference in the present application.

TECHNICAL FIELD

This invention relates generally to the field of logical priority decision mechanisms for use in computer and electronic logic systems. More particularly, the present invention relates to a method and apparatus for prioritizing requests to multiple shared resources by multiple requestors, especially requests by multiple processors to common shared resources in a multiprocessor system.

BACKGROUND ART

In an effort to increase the processing speed and flexibility of supercomputers, the cluster architecture for highly parallel multiprocessors described in the previously identified parent application, Ser. No. 07/459,083, provides an architecture for supercomputers wherein multiple of processors and external interfaces can make multiple and simultaneous requests to a common set of shared hardware resources, such as main memory, global registers or interrupt mechanisms.

One of the important limitations in designing such a cluster architecture is providing a fair and efficient method and apparatus for prioritizing requests to multiple shared resources by multiple requestors, in this case requests by multiple processors to common shared resources in a highly parallel multiprocessor system. Prior art methods and systems for determining the priority among multiple competing requestors to common shared resources are inadequate to meet the needs of such a cluster architecture.

It is recognized that a computer or electronic logic system which communicates with a shared resource requires a switching network. This implies that conflicts can occur when multiple requestors are attempting to simultaneously access the shared resource. Consequently, some type of arbitration algorithm must be employed to determine which requestor is to be granted access to the destination resource having conflicting requests. A fair and efficient system must satisfy at least the following goals: (1) any free resource will always receive a grant if there is at least one valid request attempting to access it; (2) relative time ordering of requests is maintained (i.e., access is granted on a first come first serve basis); (3) equal access to all resources is provided for each requestor (i.e., "fairness" is ensured when arbitrating among requestors); (4) wait time during requestor conflicts is minimized; and (5) arbitration control decision time is minimized.

Although several types of arbitration algorithms exist in the prior art, the traditional prior art arbitration algorithms are not effective at meeting these goals. Two of the more common prior art arbitration algorithms are the Round Robin and the Priority Ring.

Round Robin is a prior art technique that gives each requestor an opportunity to be the highest priority. This opportunity is given to each requestor, one at a time through a rotating mechanism. The problem associated with this is that a requestor's priority is unrelated to when the request is actually made. In other words, the requestor might have been rotated to lowest priority just prior to the request. Thus, subsequent requests are serviced prior to the original one. This fails to satisfy goals 2 and 4 set forth above.

A Priority Ring is another prior art arbitration technique. This scheme gathers requests made over a given time period into a group or "ring". At the end of the time period, the ring is closed and all requests that have been stored in this ring are processed according to a fixed priority resolution mechanism. While the requests that were gathered into the first ring are processed, subsequent requests are gathered into a new ring. When all of the requests in the first ring have been processed, the second ring is closed, and the first ring is free to accept new requests. The problem associated with this technique is that a given requestor always has a fixed priority relative to the other requestors within each ring. Thus, the algorithm favors certain requests over others and it allows later requests to be granted before previous ungranted requests, thereby failing to satisfy goals 2, 3 and 4 set forth above.

Because of the inherent limitations of the present methods and systems for determining the priority among multiple competing requestors to common shared resources, it is not possible to fairly and efficiently prioritize such requests in a manner that allows for requestors to be serviced on a first-come, first-served basis. Therefore, a new method and apparatus for a multiple request toggling priority system is needed that provides for a fair and efficient prioritization of multiple simultaneous requests in a single clock cycle.

SUMMARY OF THE INVENTION

The present invention provides a method and apparatus for a multiple request toggling priority system that allows fair and efficient arbitration of simultaneous multiple requests to common shared resources. The present invention achieves this objective by the symmetry and balance of the design of the toggling priority system. All requestors are arbitrated in a distributed and democratic fashion. The present invention assigns priority to multiple requests on a first-come, first-serve basis with the priority of multiple simultaneous requests being resolved on the basis of a toggling system.

The Multiple Requestor Toggling (MRT) priority system of the present invention is capable of using a simple boolean algorithm to control a variety of switching mechanisms. The MRT priority scheme is applicable to any system where multiple requestors communicate with a commonly shared resource requiring an arbitration network to resolve simultaneous conflicting requests to that resource. In this case, resolution of conflicts refers to the determination of the order in which requests for access to the common resource are serviced. The MRT priority system of the present invention is also useful for determining access to multiple shared resources. In this case, part of the MRT priority system, the inhibit matrix, is associated with each one of the multiple shared resources and a plurality of these inhibit matrices are connected to each of the requestors. Each of these parts per shared resource are connected to a common part, the relative priority state storage means, which maintains the priority of each requestor relative to the others for all shared resources.

The MRT priority system can be used to control a wide range of switching applications. The switching mechanism can be embodied in any network topology, such as a Ring, an N-cube, a Near Neighbor or a Fully Interconnected Crossbar. The MRT algorithm can be employed in any level of a hierarchical switching network. The switch itself can be implemented using any logical steering circuit such as a simple multiplexer or other similar mechanisms.

In the preferred embodiment of the present invention, the MRT algorithm is implemented in a synchronous, sequential environment where the arbitration sampling interval is one system time period (e.g., a clock cycle). The MRT algorithm is an effective way of accomplishing the goals for an arbitration algorithm as set forth above. In the preferred embodiment, the present invention is implemented with relatively simple circuitry and in practice is an extremely efficient solution for determining which requestor(s) will receive a grant during any sampling interval. In addition, the MRT algorithm optionally provides the capability of producing a grant per resource per time period when used in multiple requestor/multiple resource applications. The grants per requestor can also be encoded to form multiplexer select inputs used to steer a data switch mechanism implemented using multiplexers.

Although the present invention may be used in many situations where arbitration among multiple requestors is necessary, the present invention is a particularly important ingredient in the design of highly parallel computer processing systems. In the preferred embodiment of the highly parallel computer processing system utilizing the present invention, each multiprocessor cluster includes shared resources for storing and retrieving data and control information, a plurality of tightly-coupled, high-speed processors capable of both vector and scalar parallel processing and a plurality of distributed external interfaces that allow for the transfer of data and control information between the shared resources and one or more external data sources. All of the processors and external interfaces in the cluster are symmetrically interfaced to the shared resources, both intra-cluster and inter-cluster, through a plurality of arbitration nodes that utilize the MRT priority system of the present invention. At least two processors and two external interface means are connected to each arbitration node. For inter-cluster access, a remote cluster adapter associated with each cluster and also having the MRT priority system of the present invention is operably connected to remote cluster adapters in all other clusters. The remote cluster adapter allows the arbitration nodes in one cluster to access the shared resources of all other clusters, and also allows all other clusters to access the shared resources within this cluster.

The shared resources of the preferred embodiment include a shared main memory, a shared group of global registers and a shared interrupt mechanism. Access to the shared resources is equivalent and symmetric across all processors and external interfaces. This is true even if the processors and external interfaces are connected to the same arbitration node, to different arbitration nodes in the same cluster, or to arbitration nodes in different clusters. The need for job optimization which would otherwise be required in order to accommodate a particular memory-hierarchy is minimized by the symmetry of access to shared resources accomplished by use of the MRT priority system of the present invention.

An objective of the present invention is to provide a method and apparatus for a multiple request toggling priority system that allows for a fair and efficient prioritization of multiple simultaneous requests in a single clock cycle.

Another objective of the present invention is to provide a method and apparatus for a multiple request toggling system algorithm that grants any access that can be granted to the requestor.

A further objective of the present invention is to provide a method and apparatus for a multiple request toggling priority system algorithm that maintains the relative time ordering of the requests.

An additional objective of the present invention is to provide a method and apparatus for a multiple request toggling priority system algorithm that provides equal access to all requestors.

Still another objective of the present invention is to provide a method and apparatus for a multiple request toggling system algorithm that minimizes the wait time during conflicts for requestors.

Still another objective of the present invention is to provide a method and apparatus for a multiple request toggling priority system algorithm that minimizes the control decision time for requestors.

These and other objectives of the present invention will become apparent with reference to the drawings, the detailed description of the preferred embodiment and the appended claims.

DESCRIPTION OF THE PREFERRED EMBODIMENTS

Figure 1:
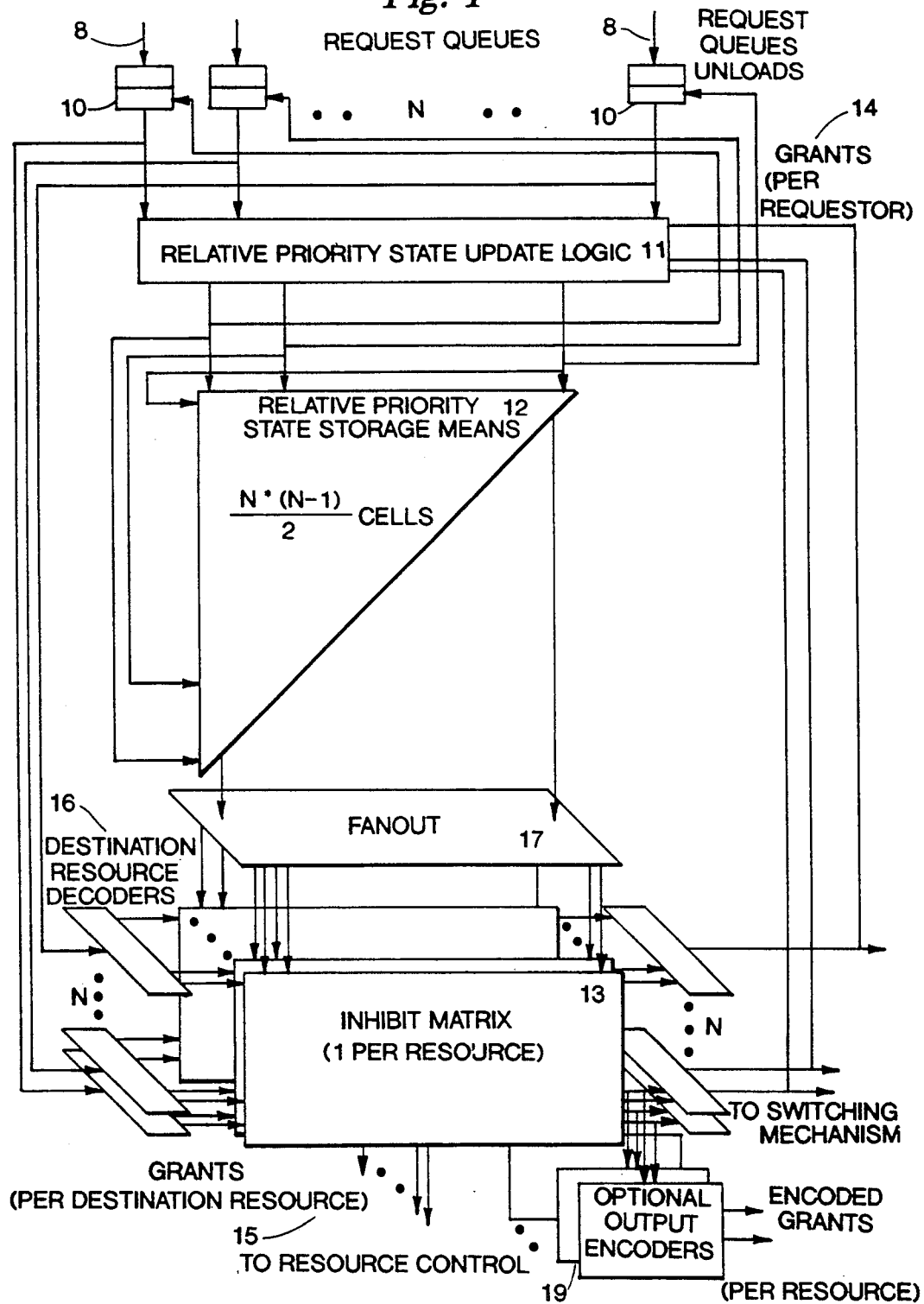
FIG. 1 is a block diagram of an arbitration network showing an MRT arbitration algorithm.

Referring now to FIG. 1, the method and mechanism of the MRT arbitration algorithm will be described. In the preferred embodiment, the MRT arbitration system comprises a plurality of request queues 10, relative priority state update logic 11, a relative priority state storage means 12, and one or more inhibit matrices 13.

The input to the MRT arbitration system is a set of request queues 10, one per requestor. The input request queues 10 store the incoming requests including any information necessary to make the arbitration decision, such as the address of the destination resource which is useful in identifying the resource being requested, as well as checking to see if any reserved resources are busy. In the preferred embodiment of the invention, each request queue 10 operates as a First-In-First-Out (FIFO) queue structure. A request queue 10 is loaded when a requestor has an operation ready for arbitration, and it is unloaded when the MRT algorithm generates a grant 14 for that requestor. The outputs of the request queue 10 are used to drive both the relative priority state update logic 11 and the inhibit matrix 13.

The MRT algorithm maintains a relative priority state storage means 12 which stores the relative priority state of every requestor relative to every other requestor. Each cell or bit in the relative priority state storage means 12 represents the relative priority of two requestors. This cell indicates which of the requestors will be granted access in the case of simultaneous resource requests. Each of the cells of the relative priority state storage means 12 are connected to the inhibit matrix 13.

When the MRT algorithm is used to control access to a single resource, each cell in the relative priority state storage means 12 drives two gates in the inhibit matrix 13 for that destination. One gate represents requestor x inhibiting requestor y if x is higher priority, while the other gate represents requestor y inhibiting requestor x if y is highest.

When the MRT algorithm is used in a multiple destination resource application, one relative priority state storage means 12 can be connected by means of fanout logic 17 to drive all inhibit matrices 13 (one per destination). In this case, the relative priority state update logic 11 is sufficient to ensure "statistical fairness" for all requestors (although more than one relative priority state storage means 12 could be used). Furthermore, for N requestors, the relative priority state storage means 12 can be thought of as an N by N triangular matrix, minus the diagonal (there is no relative priority between a requestor and itself). For a given number of N requestors, the number of cells required in the relative priority state storage means 12 is $(N*(N-1))/2$.

Figure 2:
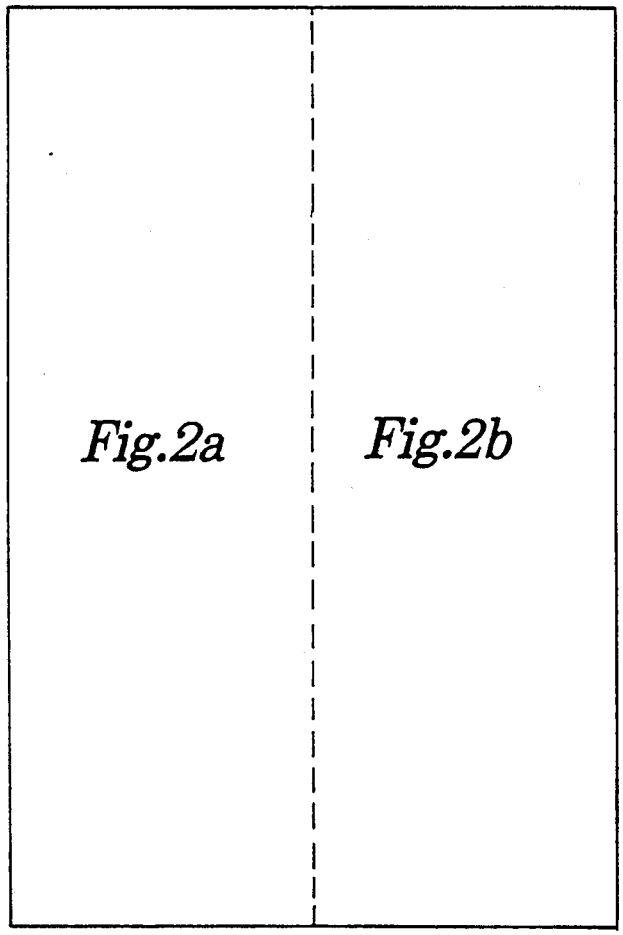
FIGS. 2, 2a and 2b are detailed circuit diagram for the MRT inhibit matrix shown in FIG. 1.
Figure 2A:
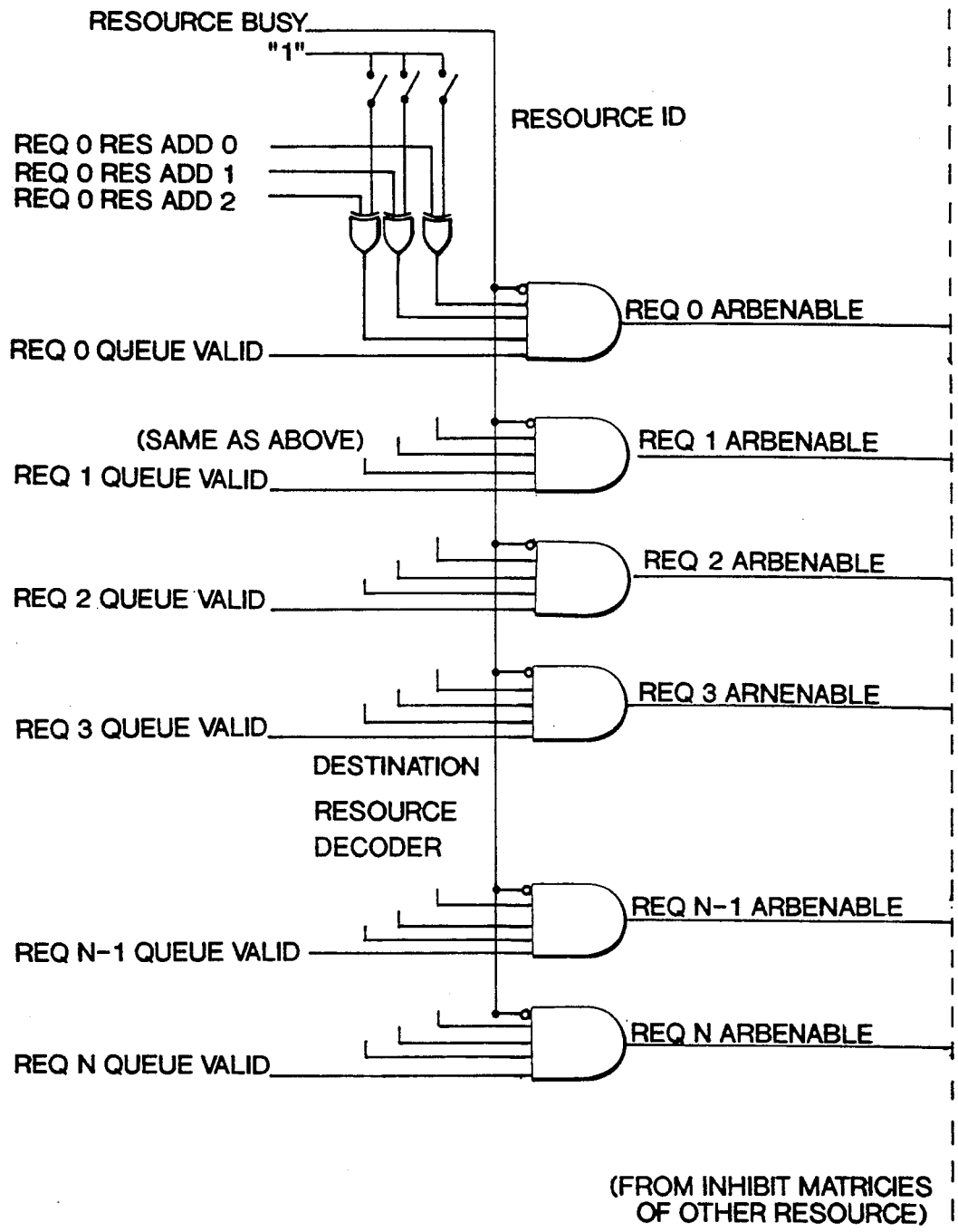
Figure 2B:
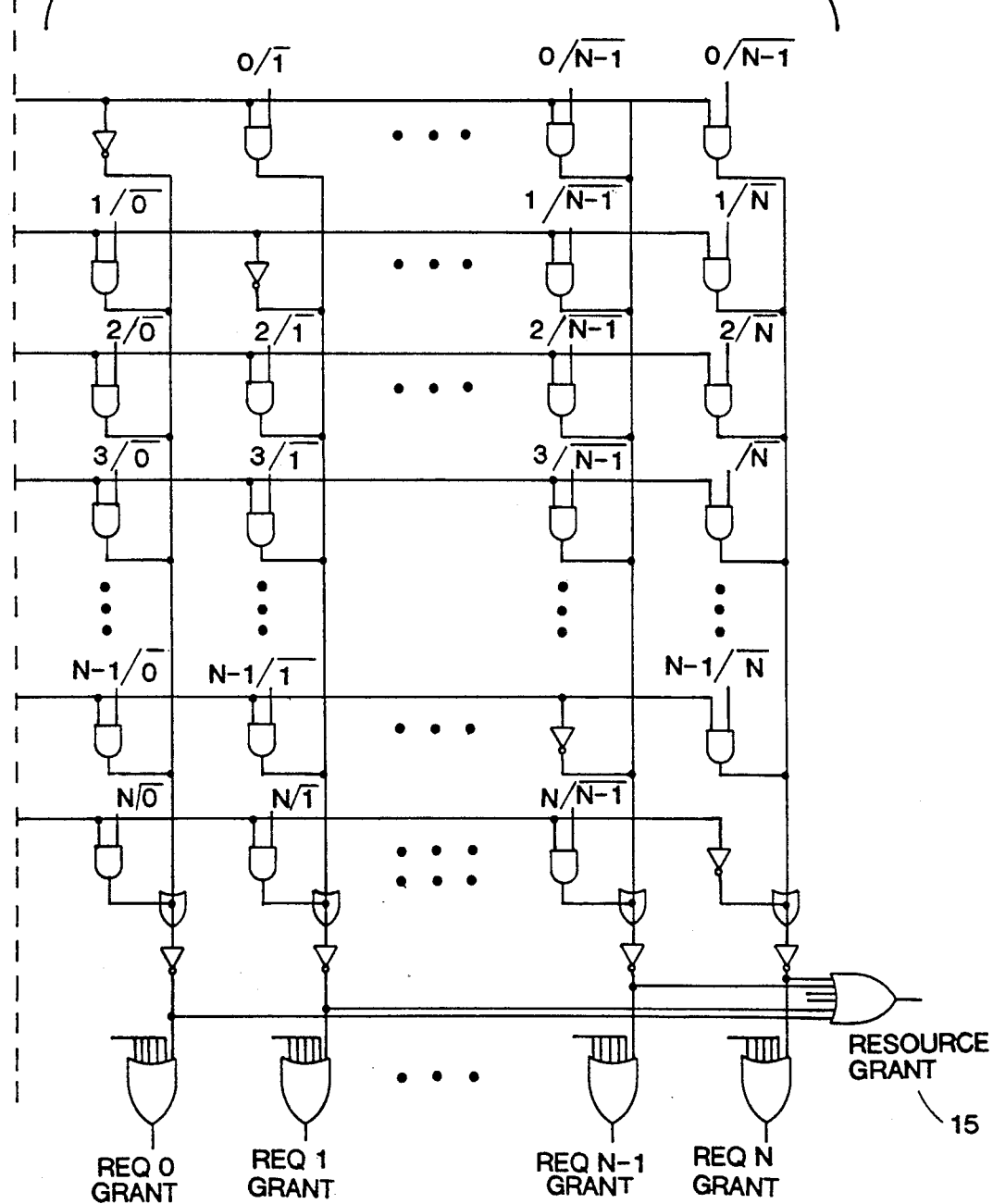

Referring now to FIGS. 2a and 2b the inhibit matrix 13 will be described. The inhibit matrix 13 is a combinational logic network. There is one matrix per resource. It accepts inputs from the request queues 10 and the relative priority state storage means 12. First, the inhibit matrix 13 examines the outputs of the request queues 10, searching for a request that decodes to the resource for which this matrix is arbitrating. Once a valid request is established from a specific requestor for this resource (and any reserved resource check for this destination indicates that the resource is available) an arbitration enable condition exists for this requestor.

It will be recognized that a distinction may exist between a resource being arbitrated for and a reserved resource. A given resource being arbitrated for may have one or more reserved resources associated with it. The MRT arbitration system may, optionally, include a qualification step that checks the arbitration request to see if it is attempting to access a reserved resource. The result of this qualification can be used to validate the operation being presented to the MRT arbitration system. Thus, reserved resources can have a busy time associated with them that prevents new requests from overrunning previously granted requests. When a reserved resource is busy, that reserved resource will not prevent requests for other resources from being granted. In this sense, the MRT arbitration system can be used to multiplex multiple resources that are only accessible through a single destination path. For example, in the event that each of a number of resources associated with a destination path has a queue for holding arbitrated requests and the queue for one of the resources becomes full, the reserved resource qualification step prevents additional requests from overrunning the one queue, while still allowing other requests to be routed to other open queues associated with the single destination path. This amounts to a pre-processing check on the ultimate availability of one of a plurality of resources associated with a single destination path prior to the time that the request is actually arbitrated. As a result, the pipelines or queues involved in the arbitration can be continually filled and a bubble in the pipeline is not created by arbitrating for a request that cannot be serviced, for example, because of a full queue.

For N requestors the inhibit matrix 13 is organized as a full N×N matrix. The arbitration enables for each requestor form the rows of the matrix, while the columns represent an inhibit condition for each requestor. The inhibit matrix 13 has the property that a requestor of higher priority disables a requestor of lower priority. Therefore, the requestor with the highest priority is the only one enabled to receive a grant 14 (per column). Each row/column intersection in the inhibit matrix 13 corresponds to a specific requestor inhibiting another requestor from obtaining a grant 14. The logic at each intersection point interrogates the relative priority state bit corresponding to the appropriate pair of requestors.

Grants 14 for each requestor are generated by logic that detects no inhibits in a column. If the requestor in a given row has an arbitration enable condition and is currently higher priority than another requestor in a given column, an "inhibit" will occur such that the logic constituting this column will not generate a grant 14 for the latter requestor during this sampling interval. Because the value of the relative priority state storage means completely described the priority hierarchy at all times, the highest priority requestor with a valid arbitration enable will be the only one able to obtain a grant per inhibit matrix 13 (i.e., per resource) each interval.

Figure 3A:
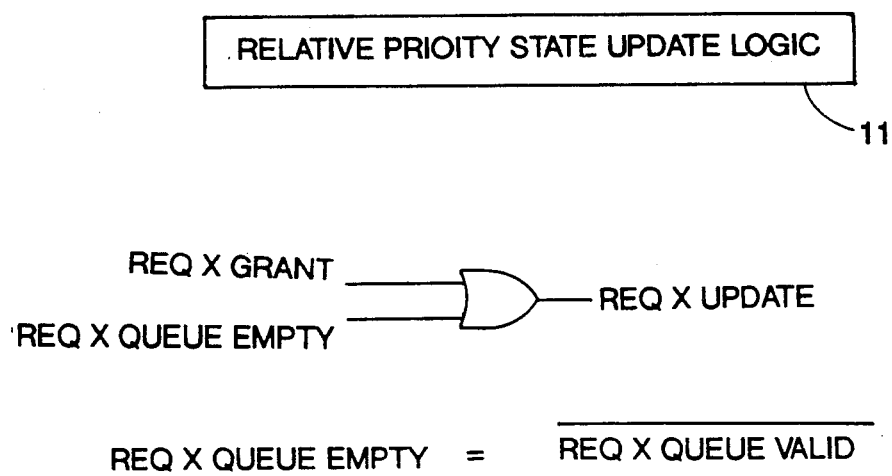
FIGS. 3a and 3b are more detailed circuit diagrams of the MRT relative priority state update logic and the relative priority state storage means shown in FIGS. 1 and 2.
Figure 3B:
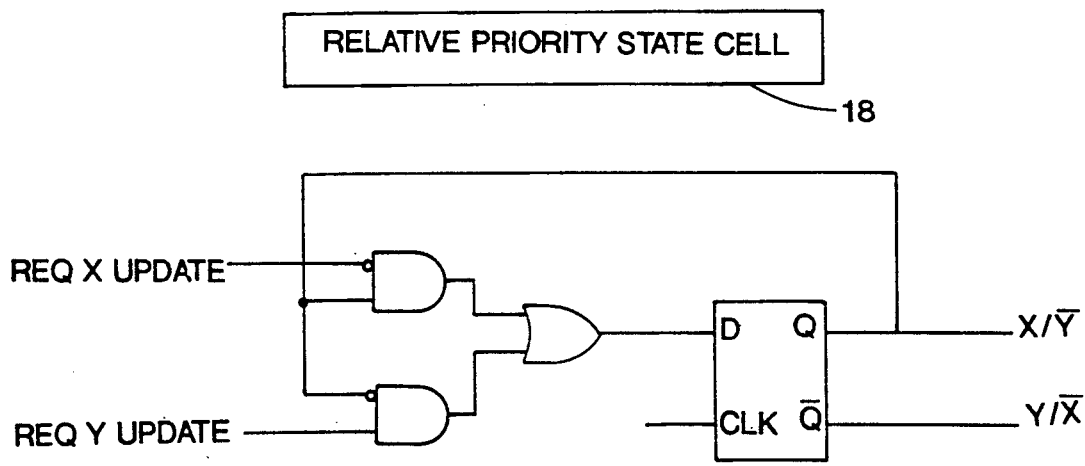

Referring now to FIGS. 3a and 3b, the relative priority state update logic 11 and the relative priority state cell 18 will be discussed. The relative priority state update logic 11 exists at the input to the relative priority state storage means 12. It accepts as input, requests from the request queues 10 and grants 14 out of the inhibit matrix 13. The relative priority state update logic 11 is entirely combinational and its function is to determine when to modify or update the bits in relative priority state storage means 12. The purpose of the relative priority state update logic 11 is to modify the relative priority cells associated with a given requestor, such that the requestor becomes lowest priority. This action is performed so that any previous request dynamically rises in priority relative to the new one. Each cell in the relative priority state storage means 12 consists of a set/reset circuit which stores the relative priority between two requestors. There are two inputs to each cell 18. One input sets requestor x to lowest priority, and the other sets requestor y to lowest priority. If both inputs are true, the state of the cell toggles. If neither input is true, the cell remains unchanged. When it is necessary for the algorithm to set a requestor to lowest priority, the inputs of all cells corresponding to that requestor are enabled. These are the cells which define the priority of that requestor relative to each of the others. When two requestors both need to be set to lowest priority, the relative priority state update logic 11 toggles the relative priority cell 18 for that pair of requestors. This results in one requestor being higher priority than the other, but no bias exists towards favoring one priority state over the other. This toggling function is the mechanism which implements the "fairness" feature of the MRT algorithm.

Because one of the goals of an arbitration system is to minimize the control decision time, the preferred embodiment of the MRT algorithm uses an "anticipatory" update function to maintain the relative priority state. In other words, the relative priority state has already been "updated" at the time a request arrives. This is accomplished by allowing the update to occur even when the request queue is empty. In essence, the update function is always occurring while the request queues are empty, such that all inactive requestors are continuously attempting to set themselves to lowest priority, thereby toggling their appropriate relative priority bits. An update to the state storage means 12 is generated whenever an access is granted 14 or whenever the associated request queue 10 is empty. When the relative priority state update logic 11 detects a valid request at the output of a request queue 10 (thus the queue is not empty), the state update logic 10 stops updating state matrix 12, allowing the relative priority of the requestor to dynamically rise until a grant 14 is given. Thus, in its simplest form, the update function is a logical "OR" of request queue empty or grant (see FIG. 3a). This is an important feature for time critical applications of the MRT algorithm of the present invention.

One characteristic of the MRT algorithm is that the priority state is modified based on when requests appear. Because the priority state reflects the relative age of the requests, giving older requests higher priority than newer requests, the priority state dictates the order in which the requests are granted. Thus, the MRT algorithm maintains relative time ordering of the requests as seen at the outputs of the request queues 10. This characteristic effectively minimizes the wait time when conflicts exist because newer requests cannot be granted before older requests. The longest a request ever has to wait is strictly a function of how many ungranted requests have been presented prior to this one.

Another characteristic of the present invention is that internal feedback is used (in the form of a grant per requestor 14) to modify the relative priority state 12 and unload the request queues 10. The grant 14 sets the requestor to lowest priority in anticipation of a new request and advances the request queue 10 to the next item. The queue may or may not contain another request. If a request is present, it will be arbitrated against other requests as the lowest priority. As long as any pending requests are accessing different resources and their associated reserved resources are not busy, all requests can be granted. Thus, the MRT arbitration system has the ability to generate grants 14 for the same (or different) requestor(s) every cycle. This accomplishes the goal of granting any access that can be granted.

When the MRT algorithm is used in a multiple resource application, the set of requestors competing for one of the resources is a subset of all the requestors that are ordered in the relative priority matrix. Therefore, this subset is also ordered in relative priority. Because the relative priority state 12 reflects the relative age of the requests, the priority state has no bias towards favoring any particular priority assignment, and fairness is ensured within the subset.

The MRT arbitration system, when used with multiple inhibit matrices 13 (for multiple resources) internally generates a grant per requestor for each inhibit matrix 13. Thus, the algorithm maintains a grant per requestor, per resource 15. Since these grants are generated in both forms by the algorithm, they can be combined in either dimension to not only generate grants per requestor 14, but grants per destination 15. This can be extremely useful in certain applications such as initiating references to banks of memory.

Referring again to FIG. 1, an optional output encoder 19 can be included in the MRT arbitration system which takes the grants per requestor and encodes them for each resource. This is very useful when controlling a switch mechanism implemented using multiplexers (per destination resource) which select each of the requestors. Because the MRT system only grants one requestor per destination 15 each cycle, the algorithm guarantees that the grants per requestor 14 are mutually exclusive. This allows the output encoder 19 to be implemented as a simple encoder function, as opposed to a priority encoder which is more complex.

Figure 4:
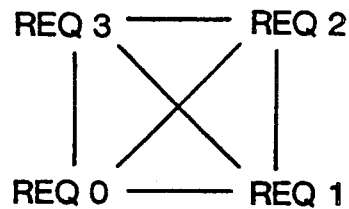
FIG. 4 is a state diagram representation of a relative priority state storage means for a four requestor MRT system of the present invention.

Referring now to FIG. 4, an example of a four requestor MRT system of the preferred embodiment will be described. It can be seen that in order to maintain the relative priority among four requestors of equal priority, it is necessary to store information on six conditons or states that identify the relative priority of each of the six possible combinations of priority pairs, e.g., Req 0's priority with respect to Req 1, Req 0's priority with respect to Req 2. etc. In the MRT system of the present invention, the state of each priority pair is stored as a single bit that represents the requestor's relative priority with respect to one specific other requestor. Because a requestor is either higher or lower priority than any other requestor, one state (one cell) is sufficient to represent each priority pair. Thus, for N requestors, it is possible to represent the number of relative priority states among all N requestors with $(N*(N-1))/2$ bits.

Figure 5A:
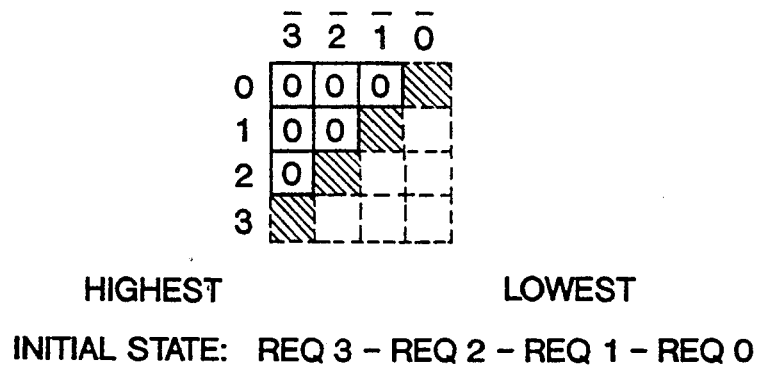
FIGS. 5a, 5b, 5c, and 5d are state diagram tables for the four requestor MRT system shown in FIG. 4.

FIGS. 5a-5d show a relative state table for all of the priority pairs of the 4 requestor system shown in FIG. 4. In this system, each priority pair is represented by a single cell. The inputs to the relative state table are comprised of both a positive and negative representation of each requestor. When the update condition is true for a given requestor, the algorithm attempts to set all of the bits for that requestor to lowest priority, i.e., positive bits are set to "0" and negative bits are set to "1". To "read" the relative state table as shown in FIG. 5a, each row is examined. In the initial state shown in FIG. 5a, row 0 shows Req 0 is lower than Req 1, Req 2 and Req 3. Row 1 shows that Req 1 is lower than Req 2 and Req 3. Row 2 shows that Req 2 is lower than Req 3. Thus, the priority pairs for all six states are represented in the relative state table.

Figure 5B:
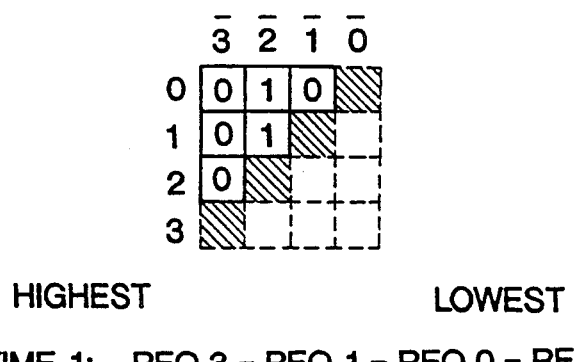

Referring now to FIG. 5b, the relative state table is shown at Time 1 when Req 2 has an update condition. As can be seen, Req 2 modifies the relative state table in response to the update and is now the lowest priority requestor. Req 2 has set all of its positive states to "0" and all of its negative states to "1". Reading row 0, Req 2 is lower than Req 0, but Req 0 is still lower than Req 3 and Req 1. Row 1 shows that Req 2 is lower than Req 1, but Req 1 is still lower than Req 3. Finally, row 2 shows that Req 2 is still lower than Req 3. Thus, Req 2 is set to the lowest priority and will be serviced if Req 0, Req 1 or Req 3 is not presently requesting access to the resource being arbitrated.

Figure 5C:
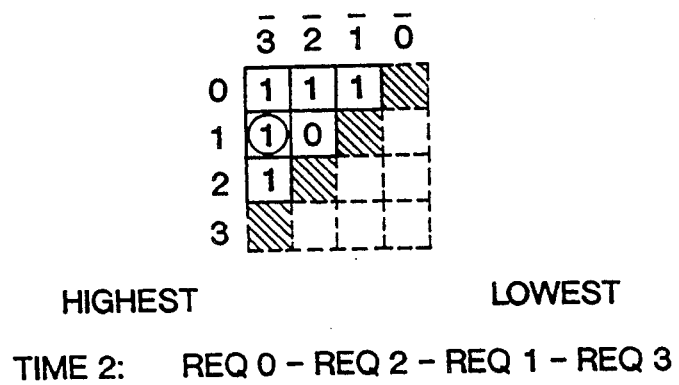

The relative state table is shown at Time 2 in FIG. 5c when new update conditions are active for both Req 1 and Req 3. Again, an attempt is made to set all of the cells associated with each requestor that has a valid update condition to the lowest priority. In row 0, both Req 1 and Req 3 are now lower than Req 0. Req 2 is still lower than Req 0 because the priority pair bit (0/2') remains in its previous condition, if no update condition exists for Req 0. The circled priority pair bit (1/3') illustrates the toggling case when two requestors collide (i.e., have simultaneous update conditions). In this case, Req 1 is higher than Req 3 and would be the requestor to be serviced first in the event that they are both contending for the same resource.

Figure 5D:
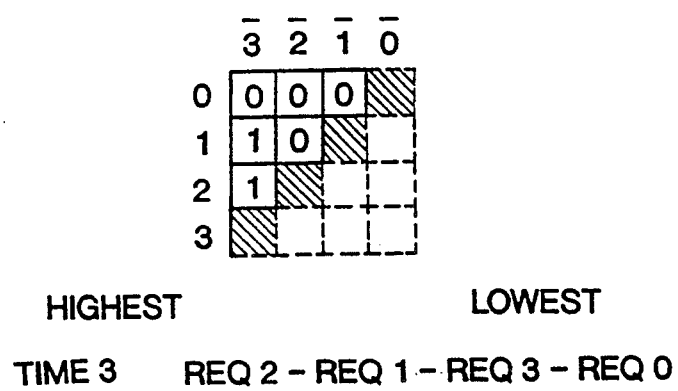

FIG. 5d shows the relative state matrix at Time 3. During Time 3, a new update condition exists from Req 0 which updates all of its priority pair bits. After all requestors have been serviced, and assuming that all input request queues are empty, the relative state matrix begins to toggle the priority state bits on each clock cycle until one or the other requestors "freezes" the state with a new valid request. This toggling insures that if simultaneous requests from any two requestors are receive again, both requestors have an equal chance of being set to the higher priority in the priority pair bit of the relative state matrix.

It will be noted that in the MRT system shown in FIGS. 5a-5d, a maximum delay of four cycles can occur if all four requestors have valid requests to the same resource during the same cycle (assuming no reserved resource busy time).

In summary, the MRT algorithm meets all of the specified goals listed above. It is superior to prior art techniques in performance. It is easily implementable in simple circuitry. It provides the ability to generate the grant result in several forms, and is adaptable to a wide range of switching arbitration control applications.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A multiple request arbitration system for determining priority among a number N of requestors to a common shared resource where N is an integer number greater than 2, the arbitration system comprising:

state storage means for storing at least $(N*(N-1))/2$ relative priority state indicators, each priority state indicator dynamically representing the priority for access to the common shared resource between a unique pair of requestors over a plurality of arbitration periods such that the relative priority of every unique combination of pairs of requestors is represented by the relative priority state indicators for each arbitration period; and for each requestor:

input means operably connected to the state storage means for presenting a request from the requestor to update all of the relative priority state indicators in the state storage means that are associated with the requestor once during an arbitration period; and output means responsive to all of the relative priority state indicators in the state storage means that are associated with the requestor for signaling the shared resource that the requestor has obtained grant to the shared resource in response to the request for this arbitration period when all of the relative priority state indicators that are associated with the requestor indicate that the requestor has priority for access to the common shared resource, such that the state storage means determines the relative priority on a first-come, first-serve toggling basis by setting the relative priority state indicators for each requestor to a lowest priority state on each arbitration period of the arbitration system unless the requestor has a valid request which was not granted on the previous arbitration period, and, in the event that both requestors associated with a relative priority state indicator are attempting to set that relative priority state indicator to the lowest priority state, toggling the relative priority state indicator between the lowest priority state for each of the requestors on successive arbitration periods of the arbitration system.

2. The multiple request arbitration system of claim 1 wherein the relative priority state indicators are stored as a single bit for each unique pair of requestors.

3. A multiple request arbitration system for determining priority among a number N of requestors to a number M of shared resources on the basis of requests issued by the N requestors indicating which of the M shared resources is requested, the arbitration system comprising:

state storage means for storing a plurality of relative priority state indicators, one for each unique pair of requestors for dynamically representing the relative priority state of the requests for that unique pair of requestors over a plurality of arbitration periods;

input means operably connected to the state storage means for receiving the next request to be processed for each of the N requestors and for updating the status of the all of the relative priority indicators associated with each requestor once during an arbitration period;

M inhibit matrix means operably connected to the state storage means, each inhibit matrix means operably connected to a unique shared resource for determining in response to the relative priority state indicators which request will be granted access to the shared resource associated with the inhibit matrix means for that arbitration period and for generating a resource grant signal to the shared resource; and N destination resource decoder means, each destination resource decoder means operably connected to an associated requestor and to each of the M inhibit matrix means for enabling the inhibit matrix means associated with the shared resource indicated by the request to grant access to the shared resource in response to the request for that arbitration period.

4. The multiple request arbitration system of claim 3 wherein the relative priority state indicators are stored as a single bit for each unique pair of requestors and the number of relative priority state indicators is at least $(N*(N-1))/2$.

5. The multiple request arbitration system of claim 4 wherein the arbitration period is a clock cycle and the state storage means determines the relative priority on a first-come, first-serve toggling basis by setting the relative priority state indicators for each requestor to a lowest priority state on each clock cycle of the arbitration system unless the requestor has a valid request which was not granted on the previous clock cycle, and, in the event that both requestors associated with a relative priority state indicator are attempting to set that relative priority state indicator to the lowest priority state, toggling the relative priority state indicator between the lowest priority state for each of the requestors on successive clock cycles of the arbitration system.

6. The multiple request arbitration system of claim 3 wherein each inhibit matrix means comprises:

N enable logic means, each enable logic means associated with a unique requestor for logically combining an enable signal produced by the destination resource decoder means for the requestor with each of the relative priority state indicators associated with that requestor; and N grant logic means, each grant logic means associated with a unique requestor for logically combining the results of all N of the enable logic means to produce a grant signal for that requestor.

7. The multiple request arbitration system of claim 6 wherein each enable logic means is comprised of $N-1$ AND gates and wherein each grant logic means is comprised of a multiplexor for combining the results of all N of the AND gates associated with a given requestor.

8. The multiple request arbitration system of claim 6 wherein the N destination resource decoder means further include qualification means for determining whether the request is a valid request based on whether the selected resource is available and for preventing the enable signal from being generated if the resource is not available.

9. The multiple request arbitration system of claim 3 further including feedback means operably connected to each inhibit matrix means and to the input means for setting the priority of the relative priority state indicators for a requestor to lowest priority after a request for the requestor has been granted by the inhibit matrix means associated with the shared resource indicated by the request.

10. The multiple request arbitration system of claim 3 further including destination grant means operably connected to each of the inhibit matrix means and to each requestor for distributing a grant signal back to a given requestor when a request has been granted between the given requestor and the shared resource indicated by the request.

11. A multiple request toggling arbitration system for determining priority among a number N of requestors to a number M of shared resources, the arbitration system comprising:

N request queue means, each request queue means for temporarily storing one or more requests from an associated requestor, each request indicating which of the M shared resource is requested;

state storage means for storing a plurality of relative priority state indicators, one for each unique pair of requestors for dynamically representing the relative priority state of the requests for that unique pair of requestors over a plurality of arbitration periods;

update priority logic means operably connected to each of the request queue means and to the state storage means for receiving the next request to be processed for each requestor and for updating the status of the relative priority indicators associated with each requestor on each arbitration period in accordance with a toggling priority scheme;

M inhibit matrix means, each inhibit matrix means operably connected to a unique shared resource for determining in response to the relative priority state indicators which request will be granted access to the shared resource associated with the inhibit matrix means for that arbitration period and for generating a resource grant signal to the shared resource;

fanout means operably connected to the state storage means and to each of the inhibit matrix means for distributing the relative priority state indicators to each of the inhibit matrix means; and N destination resource decoder means, each destination resource decoder means operably connected to an associated requestor and to each of the M inhibit matrix means for enabling the inhibit matrix means associated with the shared resource indicated by the request to grant access to the shared resource in response to the request.

12. The multiple request arbitration system of claim 11 wherein the relative priority state indicators are stored as a single bit for each unique pair of requestors and the number of relative priority state indicators is at least $(N*(N-1))/2$.

13. The multiple request arbitration system of claim 11 wherein the arbitration period is a clock cycle and the state storage means determines the relative priority on a first-come, first-serve toggling basis by setting the relative priority state indicators for each requestor to a lowest priority state on each clock cycle of the arbitration system unless the requestor has a valid request which was not granted on the previous clock cycle, and, in the event that both requestors associated with a relative priority state indicator are attempting to set that relative priority state indicator to the lowest priority state, toggling the relative priority state indicator between the lowest priority state for each of the requestors on successive clock cycles of the arbitration system.

14. The multiple request arbitration system of claim 13 wherein the update priority logic means comprises an update logic circuit for each requestor, the update logic circuit comprising a logical OR of the grant signal for the requestor with a request queue empty signal to produce a request update signal for the requestor.

15. The multiple request arbitration system of claim 14 wherein the state storage means for storing each relative state priority indicator comprises:

a relative priority state cell comprising a flip-flop circuit having a negative state output and a positive state output, a data input, and a clock input connected to the clock cycle for the arbitration system;

a first input circuit for receiving the request update signal from a first requestor of the unique pair of requestors represented by the relative state priority indicator and for combining the negative of the request update signal from the first requestor with the positive state output of the flip-flop circuit;

a second input circuit for receiving the request update signal from a second requestor of the unique pair of requestors represented by the relative state priority indicator and for combining the request update signal from the second requestor with the negative state output of the flip-flop circuit; and a logical OR circuit operably connected to the output of the first and second input circuits and the data input of the relative priority state cell.

16. The multiple request arbitration system of claim 14 wherein the request queue empty signal is the negative of a request queue valid signal that is based upon whether the resource being requested is busy.

17. The multiple request arbitration system of claim 11 wherein each inhibit matrix means comprises:
N enable logic means, each enable logic means associated with a unique requestor for logically combining an enable signal produced by the destination resource decoder means for the requestor with each of the relative priority state indicators associated with that requestor; and
N grant logic means, each grant logic means associated with a unique requestor for logically combining the results of all N of the enable logic means to produce a grant signal for that requestor.

18. The multiple request arbitration system of claim 17 wherein each enable logic means is comprised of N−1 AND gates and wherein each grant logic means is comprised of a multiplexor for combining the results of all N of the AND gates associated with a given requestor.

19. The multiple request arbitration system of claim 17 wherein the N destination resource decoder means further include qualification means for determining whether the request is a valid request based on whether the selected resource is available and for preventing the enable signal from being generated if the resource is not available.

20. The multiple request arbitration system of claim 11 further comprising:
N feedback means, each feedback means operably connected to each inhibit matrix means and to the update priority logic means for setting the priority of a requestor to lowest priority after a request for the requestor has been granted by one of the inhibit matrix means.

21. The multiple request arbitration system of claim 20 wherein each feedback means further including destination grant means operably connected to an associated request queue means for distributing a grant signal back to the requestor when a request has been granted between the given requestor and the shared resource indicated by the request and for presenting the next request in the request queue means to the update priority logic means.

22. The multiple request arbitration system of claim 11 further including output encoded means operably connected to each of the inhibit matrix means for receiving the grant signals indicating that a request has been granted between a given requestor and shared resource and for encoding the granted request for distribution to the shared resource.

23. A method for determining priority among a number N of requestors to a shared resource in a logic system where N is the integer number greater than 2, the method comprising the steps of:
providing a relative priority memory array for dynamically storing the relative priority of each unique pair of requestors as a single bit in the relative priority memory array having at least $(N*(N-1))/2$ bits of storage;
for each arbitration period in the logic system:
updating the relative priority memory array once in response to any valid requests from one or more of the requestors which have not been granted access by performing the following steps for each requestor:
setting the singls bits in the relative priority memory array for the requestor to a lowest priority unless the requestor has a valid request which was not granted access on the previous arbitration period; and
in the event that both requests associated with a single bit in the relative memory array ar attempting to set that bit to the lowest priority, toggling the bit between lowest priority for each of the requestors on successive arbitration period;
determining which of the requests has the highest priority as indicated by the relative priority memory array for that arbitration period; and
granting access from the requestor to the shared resource to the request having the highest priority.

24. The method of claim 23 wherein each of the requestors is provided with queue to hold multiple requests from the requestor to the shared resource and the step of updating the relative memory array comprises the step of:
using the request at the head of each of the queues to update the relative priority memory array.

25. A method for determining priority among a number N of requestors to a number M of shared resource in a logic system on the basis of requests issued by the N requestors indicating which of the M shared resources is requested, the method comprising the steps of:
providing a relative priority memory array for dynamically storing the relative priority of each unique pair of requestors as a single bit for each unique pair of requestors and the number of bits is at least $(N*N-1)/2$;
for each arbitration period in the logic system:
updating the relative priority memory array in response to any valid requests from one or more of the requestors which have not been granted access;
determining for each of the M shared resource which of the requests that are requesting each of that shared resource has the highest priority for that arbitration period as indicated by the relative priority memory array; and
granting access from the requestor to the shared resource to the request having the highest priority.

26. The method of claim 25 wherein the arbitration period is a clock cycle and the step of updating the relative memory array includes:
for each requestor, setting the single bits in the relative priority memory array for the requestor to a lowest priority unless the requestor has a valid request which was not granted access on the previous clock cycle;
in the event that both requestors associated with a single bit in the relative memory array are attempting to set that bit to the lowest priority, toggling the bit between lowest priority for each of the requestors on successive clock cycles.

27. The method of claim 25 wherein each of the requestors is provided with a queue to hold multiple requests from the requestor to the shared resource and the step of updating the relative memory arry comprises the step of:
using the request at the head of each of the queues to update the relative priority memory array.

28. The method of claim 25 wherein the step of updating the relative memory array further includes the step of:
determining whether the request is a valid request based on on whether the selected resource is available and preventing the enable signal from being generated if the resource is not available.

* * * * *

UNITED STATES PATENT AND TRADEMARK OFFICE
CERTIFICATE OF CORRECTION

PATENT NO. :     5,168,570

DATED      :     December 1, 1992

INVENTOR(S) :    Robert E. Eckert et al.

It is certified that error appears in the above-indentified patent and that said Letters Patent is hereby corrected as shown below:

Column 3 Line 37, please delete "information. a" and insert -- information, a-- therefore.

Column 11 Line 60, please delete "the request" and insert --the N request-- therefore.

Signed and Sealed this

Thirtieth Day of April, 1996

Attest:

BRUCE LEHMAN

*Attesting Officer*          *Commissioner of Patents and Trademarks*